United States Patent [19]

Reeser et al.

[11] Patent Number: 6,011,959

[45] Date of Patent: Jan. 4, 2000

[54] COMBINER CIRCUIT FOR DUAL BAND VOLTAGE CONTROLLED OSCILLATORS

[75] Inventors: Glen O. Reeser, Palatine; Lunal Khuon, Bolingbrook, both of Ill.; James R. Snider, Irvine, Calif.

[73] Assignee: Motorola, Inc., Schaumburg, Ill.

[21] Appl. No.: 09/040,046

[22] Filed: Mar. 17, 1998

[51] Int. Cl.$^7$ .............................. H04B 1/40; H04M 1/00
[52] U.S. Cl. .............................. 455/76; 455/78; 455/553; 455/188.1; 333/132; 333/134
[58] Field of Search ..................... 333/126, 129, 333/132, 134; 455/552, 553, 76, 78, 80, 82, 83, 73, 103, 316–318, 264, 315, 188.1

[56] References Cited

U.S. PATENT DOCUMENTS

| | | | |
|---|---|---|---|
| 3,733,608 | 5/1973 | McGhay et al. | 333/132 |
| 5,163,181 | 11/1992 | Koontz | 455/103 |
| 5,386,203 | 1/1995 | Ishihara | 455/82 |
| 5,424,695 | 6/1995 | Konishi | 333/131 |
| 5,625,674 | 4/1997 | Paniccia, Jr. | 379/61 |

FOREIGN PATENT DOCUMENTS 61-214625  9/1986  Japan ..................... 455/83

OTHER PUBLICATIONS

Montress et al., "Introduction to High Stability Saw Oscillators: Design and Performance," 1996 IEEE International Frequency Control Symposium, Jun. 7, 1996, p. 18–20.

*Primary Examiner*—Nguyen Vo
*Attorney, Agent, or Firm*—Brian M. Mancini

[57] ABSTRACT

Dual band voltage controlled oscillators (VCOs) incorporate a combiner circuit with a single output operable at two widely separated frequency bands such as 900 MHz and 1.8 GHz, for example. The combiner circuit includes a duplexer used as a combiner on the outputs of the VCOs. The duplexer can be realized in transmission line or inductor configurations. The use of the duplexer improves spurious performance and phase noise by more than 10 dB between the two operating frequency bands and supplies band rejection at the non-operating frequency.

12 Claims, 5 Drawing Sheets

COMBINER CIRCUIT FOR DUAL BAND VOLTAGE CONTROLLED OSCILLATORS

FIELD OF THE INVENTION

The present invention relates generally to voltage controlled oscillators used in frequency synthesizers in communication devices and, in particular, to dual band voltage controlled oscillators.

BACKGROUND OF THE INVENTION

New frequency spectrum allocations for personal communications have created a need for portable telephones which operate both in the existing 900 MHz frequency band as well as the newly allocated 1.8 GHz frequency band. Therefore, local oscillators for these dual band portable telephones are required to operate in two widely separated frequency ranges.

Prior art dual band devices have included; completely separate local oscillators with resistive combiner networks or filter networks, local oscillators with doublers or triplers to multiply the frequency, pin diodes or other similar RF switching devices, and extremely wide band oscillators having an operable frequency range that overlaps the two bands of interest.

The disadvantage of using resistive combiner networks is that minimal isolation is achieved between the local oscillator signals and resistive combiners which causes signal losses and noise. Filters networks improve isolation somewhat, but this adds circuit complexity and cost and draws additional current.

The disadvantage of using local oscillators with doublers or triplers to multiply the frequency is that spurious signals are always present in the output. For example, for high band signals a doubler or tripler will always have some subharmonic signal that can interfere will low band signals. Similarly, for low band signals higher harmonics can interfere with high band signals. These spurious signals must be filtered out to avoid degrading receiver performance or interference with other radio services. In addition, the parts count increases greatly with doublers and triplers and the desired output frequencies must exactly match those multiples.

The disadvantage of pin diodes is that pin diodes require significant DC current to obtain a low "on" impedance, and when the pin diodes are "off" they can create high levels of harmonically related spurious signals. Moreover, tank circuits associated with the pin diodes reduce circuit Q, which reduces efficiency, and causes higher phase noise in the output circuit. Also, pin diode switching adds to circuit complexity and cost.

The disadvantage of using extremely wide band oscillators is that wideband oscillators are necessarily very sensitive to tuning control. This sensitivity makes the oscillator more susceptible to noise on the tuning control line. Correspondingly, more sensitive tuning requires tighter coupling to the tuning element (varactor) of the oscillator which causes higher losses in the associated tank circuit.

There is a need for a combiner circuit for voltage controlled oscillators that: provides good isolation between local oscillator signals. In addition, there is a need for a combiner circuit that does not require pin diodes, is not sensitive to noise on a tuning control, minimizes spurious frequency signals, has low losses and current drain, and requires simpler, and therefore less costly, circuitry.

DETAILED DESCRIPTION OF THE PREFERRED EMBODIMENT

Dual band voltage controlled oscillators (VCOs) incorporate a combiner circuit with a single output operable at two widely separated frequency bands such as 900 MHz and 1.8 GHz, for example. The combiner circuit includes duplexer used as a combiner on the outputs of the VCOs. The duplexer can be realized in transmission line or inductor configurations. The use of the duplexer improves spurious performance and phase noise by more than 10 dB between the two operating frequency bands and supplies band rejection at the non-operating frequency.

Although there are superficial similarities between the present invention and a Wilkinson power distributor/combiner, as is known in the art, there are several novel and distinguishing advantages in the present invention.

For example, the Wilkinson device is configured to provide a constant phase difference between the signals while providing sufficient isolation between the signals. Since the present invention is only operable at one frequency at a time, there is no requirement to configure the combiner circuit to maintain any particular phase relationship between signals.

The Wilkinson device requires an additional specific impedance between the two outputs equal to twice the characteristic impedance of the signal source. An additional impedance is not used in the present invention making the combiner circuit much simpler than a Wilkinson device.

The Wilkinson device is typically used as a power splitter with a single input providing a power signal which is split into dual outputs which are operable at the same time and at the same frequency. In contrast, the present invention is a combiner circuit which takes one of two different frequency input signals and combines either one into a single output. Also, the present invention is not a power device.

The Wilkinson device can also be used as a combiner having dual inputs and a single output where a single power signal into one input has minimal power signal at the same frequency but different phase at the other input. In contrast, the present invention is a small-signal combiner circuit which is not concerned with isolating same-frequency power signals or their phase relationship. Instead, the present invention addresses the isolation of differing frequency products present at the single output and the non-operating input.

The present invention further includes each series inductance in the combiner being different to accommodate the different associated operating frequency bands. Moreover, the inductances are configured to provide a passband response within the operating frequency band while providing a stopband response in the non-operating frequency band. These features are not provided for in a Wilkinson device, and the present invention provides these features in a simpler configuration than a Wilkinson device.

Figure 1:
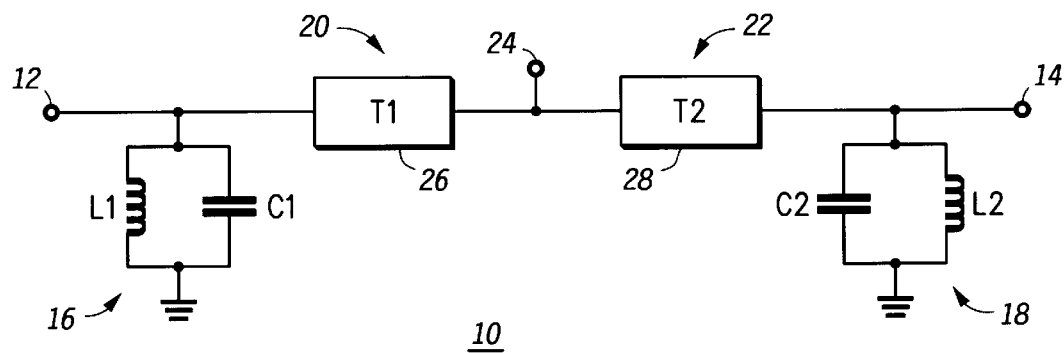
FIG. 1 is a simplified schematic diagram of a first embodiment of a dual band voltage controlled oscillator combiner circuit, in accordance with the present invention.

FIG. 1 shows a first embodiment of the present invention describing a dual band voltage controlled oscillator duplexer combiner circuit 10. The combiner circuit 10 couples first or second outputs 12,14 of first and second voltage controlled oscillators (not shown) operable at associated first and second frequency bands. The voltage controlled oscillators are of standard configurations as are known in the art. A first and a second resonant circuit 16,18 are coupled in shunt at the respective first and second outputs 12,14. The first resonant circuit 16 has a passband at the first frequency band. The second resonant circuit 18 has a passband at the second frequency. The resonant circuits 16,18 can incorporate the transistor collector circuits of their respective voltage controlled oscillators (not shown). The combiner circuit 10 includes a first and second inductance 20,22 coupled in series from the respective first and second outputs 12,14 to a common output port 24 such that the inductances 20,22 substantially isolate the first and second outputs 12,14 from the output port 24.

In particular, the first inductance 20, in conjunction with the first resonant circuit 16, provides a stopband at the second frequency band substantially isolating the first output 12 from the output port 24 when the second voltage controlled oscillator output 14 is operating within the second frequency band. The second inductance 22, in conjunction with the second resonant circuit 18, provides a stopband at the first frequency band substantially isolating the second output 14 from the output port 24 when the first voltage controlled oscillator output 14 is operating within the first frequency band.

More particularly, the first and second inductances 20,22 of the first embodiment comprise respective first and second transmission lines 26,28 each having an electrical length of about one-quarter wavelength at their associated operating frequencies. In practice, the output port 24 of the combiner circuit 10 presents some stray capacitance to the transmission lines 26,28. For this case, it is necessary to make the transmission lines 26,28 less than a theoretical one-quarter wavelength at their associated frequencies in order to provide an equivalent one-quarter wavelength at their associated frequencies. Optionally, an additional shunt capacitance (not shown) can be coupled at the common output port 24. The shunt capacitance is larger than the stray capacitance and serves to overpower and thus control the effects of the stray capacitance and to further shrink the size of the transmission lines.

Figure 2:
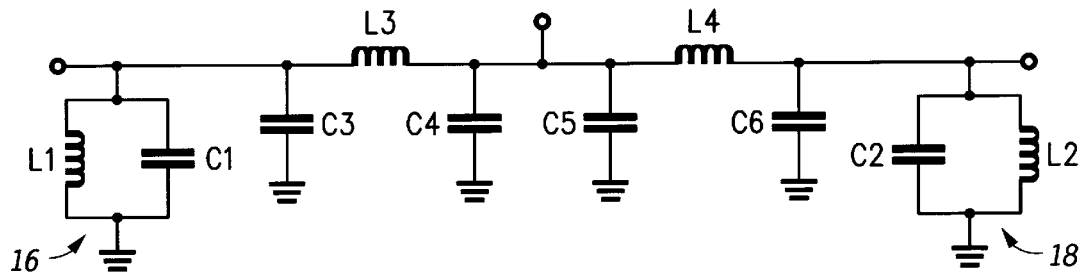
FIG. 2 is a simplified schematic diagram of a lumped element equivalent of the circuit of FIG. 1.

FIG. 2 shows an equivalent circuit of the circuit of FIG. 1 wherein the transmission lines T1,T2 are replaced by their equivalent lumped element models. In particular, transmission line T1 (from FIG. 1) is modeled as the pi-section C3, L3, C4 and transmission line T2 (from FIG. 1) is modeled as the pi-section C5, L4, C6. In addition FIG. 2 shows the first resonant circuit 16 as the combination of L1 and C1 and the second resonant circuit 18 as the combination of C2 and L2. As can be seen, the equivalent circuit present several parallel capacitances that can be easily combined to simplified circuit.

Figure 3:
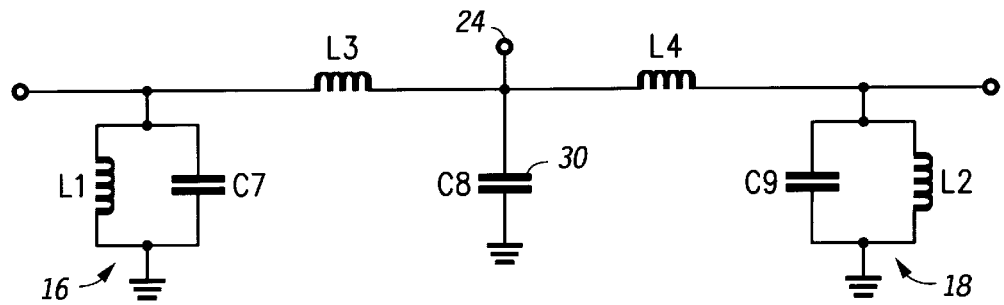
FIG. 3 is a simplified schematic diagram of a second embodiment of a dual band voltage controlled oscillator combiner circuit, in accordance with the present invention.

FIG. 3 shows a preferred embodiment of the present invention. In this embodiment, the first and second inductances are respective first and second inductors L3 and L4 which are substantially equivalent to the inductances shown in the equivalent circuit of FIG. 2. In addition, capacitors C7, C8 and C9 replace the equivalent parallel combinations of the respective capacitor pairs C1+C3, C4+C5 and C6+C2 of FIG. 2. As a result, the first resonator circuit 16 contains inductance L1 and modified capacitance C7, the second resonator circuit 18 contains inductance L2 and modified capacitance C9. Moreover, a shunt capacitance 30 is coupled at the common output port 24.

The inductors L3,L4 each have a value substantially equal to respective equivalent lumped-element inductances of one-quarter wavelength transmission lines operable at their associated frequencies. The resonant circuits 16,18 include associated capacitances C7,C9 having a value increased over a value necessary to cause resonance at the associated operating frequency (equal to C1,C2) by a value substantially equal to respective lumped-element capacitances (C3, C6) of one-quarter wavelength transmission lines operable at their associated frequencies. The shunt capacitance 30 has a value substantially equal to a sum of the lumped capacitances (C4+C5) of one-quarter wavelength transmission lines at their associated operating frequencies. Advantageously, shunt capacitor C8 can be adjusted to compensate for stray capacitance, as can capacitors C7 and C9.

The novel configuration of the combiner circuit of the present invention advantageously: allows the sharing and reuse of the resonant circuit collector coils (L1,L2), results in small inductances (L3,L4) which can be integrated saving size, has minimal parts count and cost, improves phase noise, operates at widely separate frequency bands, and provides improved frequency spectrum outputs.

In operation, either the first or second (low or high frequency) voltage controlled oscillator is enabled, but not both. Referring to FIG. 1, when the first (low frequency) voltage controlled oscillator is enabled a first (low) frequency is generated at the first output 12. A zero, due to the connection to the inactive second (high frequency) voltage controlled oscillator and combiner circuit, is coupled in shunt at the common output port 24 and provides a stopband at the high frequency band. When the second (high frequency) voltage controlled oscillator is enabled a second (high) frequency is generated at the second output 14. A zero, due to the connection to the inactive first (low frequency) voltage controlled oscillator and combiner circuit, is coupled in shunt at the common output port 24 and provides a stopband at the low frequency band.

In practice, the values of the inductances are chosen to compensate the stray capacitances of the circuit while also providing the proper passband characteristics of the combiner. For example, in the case of the inductances being transmission lines the transmission lines are typically one-quarter wavelength at their associated frequency bands, but in practice they are shortened to compensate for stray capacitance. In the case of inductors their value is lowered to compensate for stray capacitance, at the common output port for example.

Figure 9:
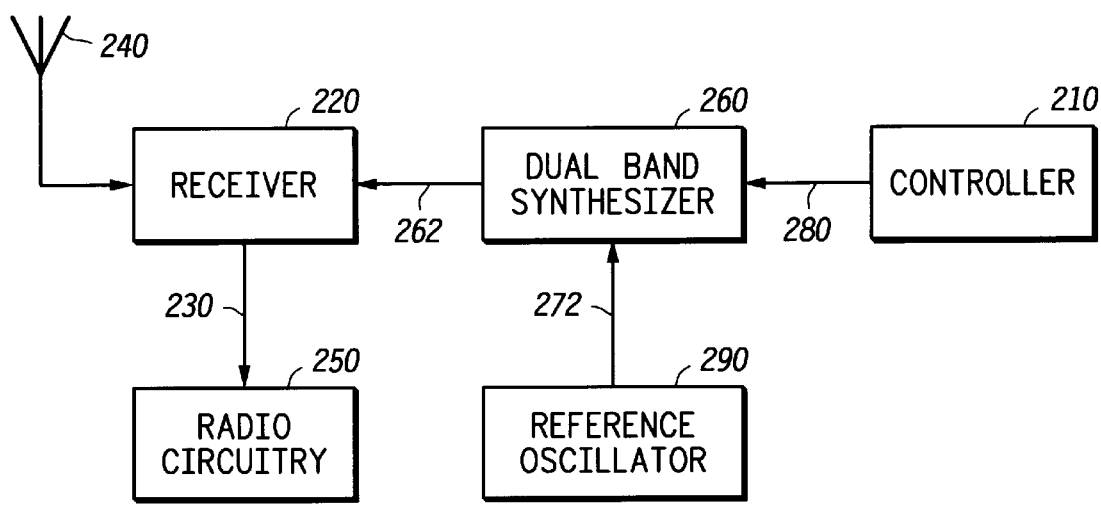
FIG. 9 is a simplified block diagram of a radio incorporating a voltage controlled oscillator combiner circuit, in accordance with the present invention.

FIG. 9 shows a block diagram of a communication device 200 which includes a dual band frequency synthesizer 260 which contains a multi-band frequency source, in accordance with the present invention. The communication device can be a transmitter, transceiver, or a receiver. In one embodiment, the communication device 200 comprises a frequency synthesized receiver which provides an output 230 to associated radio circuitry 250. The communication device 200 includes a receiver 220 which receives RF signals via an antenna 240 of a preferably dual-mode design. The receiver 220 can be controlled by the controller 210 in either digital or analog communication applications. A reference oscillator 290 provides a reference oscillator signal 272 for the synthesizer 260. The synthesizer 260 provides a receiver local oscillator signal 262, which is controlled by the multi-band frequency source of the present invention, to the receiver 220. The multi-band tunable frequency source of the frequency synthesizer 260 is operable on at least two frequency bands, utilizing the principles of the present invention, controlled by a band enable signal 280 from the controller 210.

In another embodiment, the communication device is a transceiver such as in a cellular phone. The synthesizer provides an additional transmitter local oscillator signal controlled by the multi-band frequency source. The multi-band tunable frequency source of the frequency synthesizer is operable on two frequency bands, as described above. The transmitter and receiver are switchably connected to the antenna under control of the controller.

EXAMPLE

Referring to FIGS. 4–8, dual band voltage controlled oscillators and a combiner circuit were modeled with Hewlett Packard's MDS™ software using the following approximate values for the capacitive and inductive elements, in accordance with a preferred embodiment of the present invention:

| | |
|---|---|
| L1 = 9.5 nH | L2 = 16.5 nH |
| L3 = 6.8 nH | L3 = 6.8 nH |
| C7 = 0.5 pf | C8 = 3 pf |
| C9 = 16 pf | |

Figure 4:
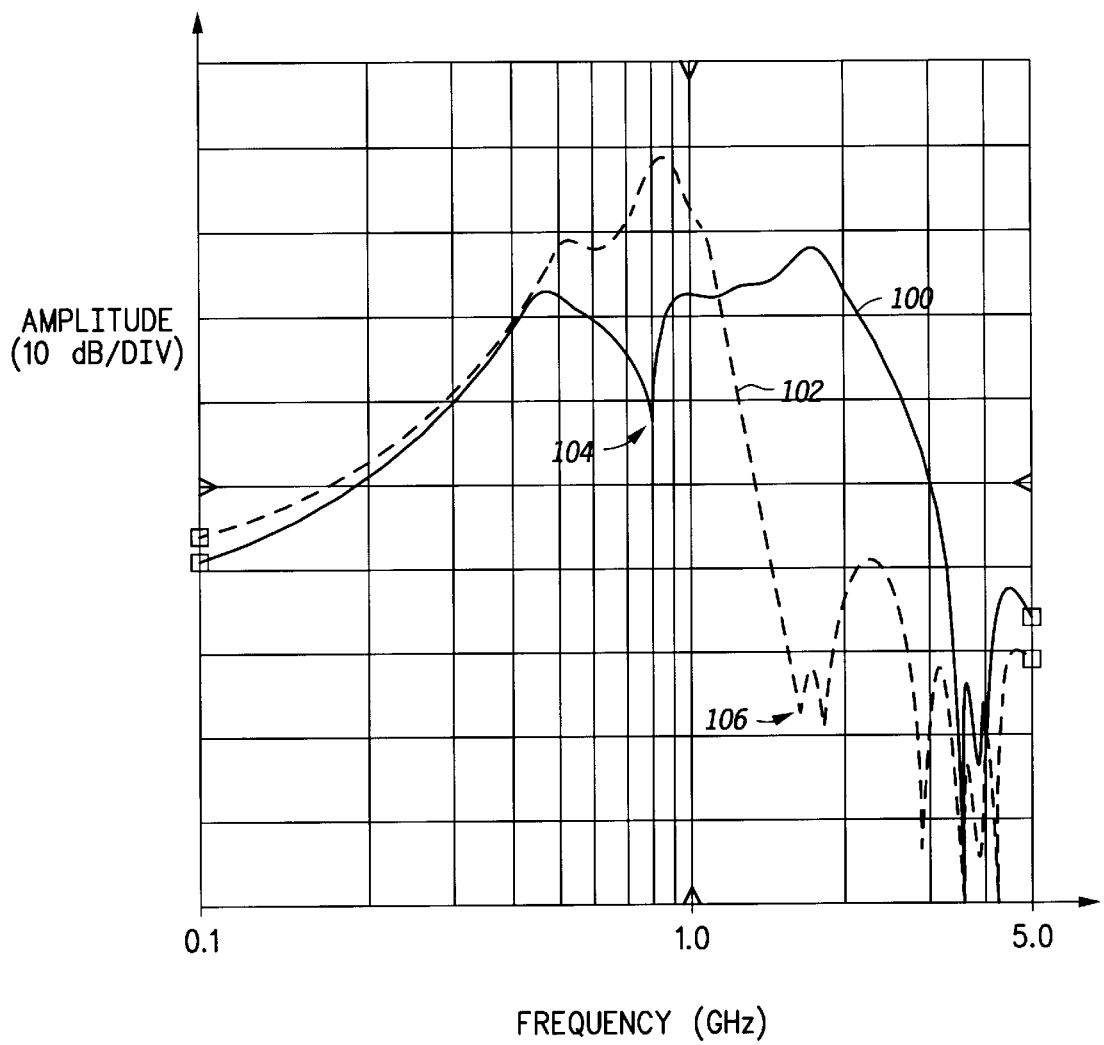
FIG. 4 is a graphical representation of the high and low band frequency response of the circuit of FIG. 3.

FIG. 4 shows high and low band frequency response 100,102 of the circuit of FIG. 3. As can be seen the high band response 100 provides a stopband 104 at or near the peak of the low band response. The low band response 102 provides a stopband 106 at or near the peak of the low band response. This provides at least a 10 dB improvement in isolation between the separate frequency bands.

FIGS. 5–8 are the actual spectrum analyzer plots of the devices built in accordance with the present invention.

Figure 5:
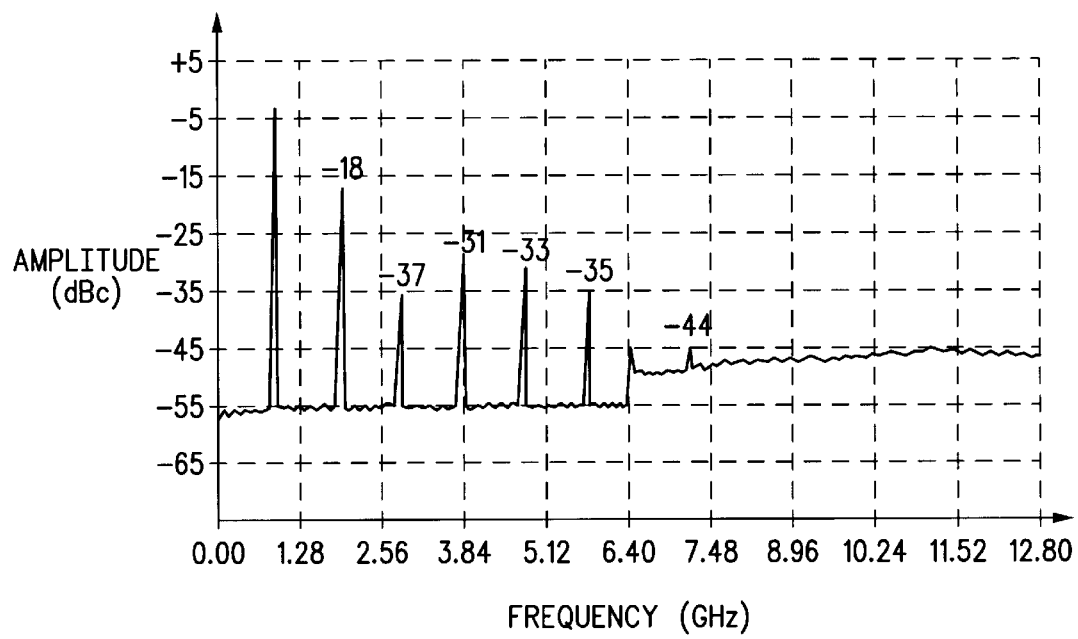
FIG. 5 is a graphical representation of the low band frequency spectrum of a prior art voltage controlled oscillator.

FIG. 5 is an actual spectrum analyzer plot for a low band frequency spectrum of a prior art voltage controlled oscillator utilizing a frequency doubler for the high band. This part is design to meet a −15 dbc second harmonic specification. As can be seen the second harmonic is −18 dbc.

Figure 6:
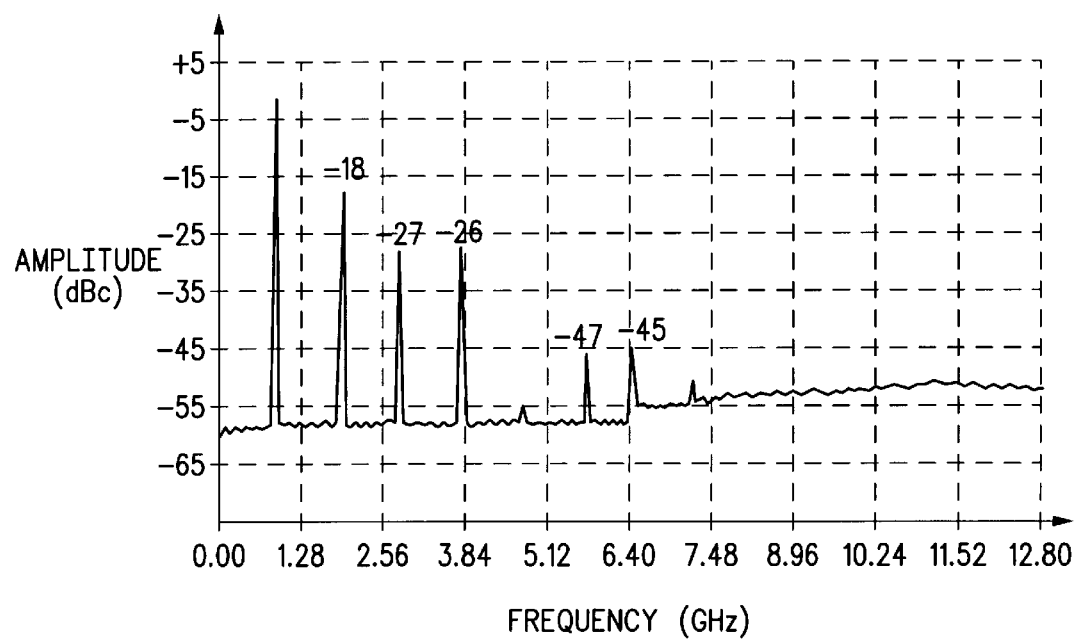
FIG. 6 is a graphical representation of the low band frequency spectrum of the circuit of FIG. 3.

FIG. 6 is an actual spectrum analyzer plot for the low band frequency spectrum of a device built in accordance with the present invention. As can be seen, the response is similar to the plot of FIG. 5 providing good second harmonic rejection of −18 dbc below the main response. The other higher harmonics are also very low.

Figure 7:
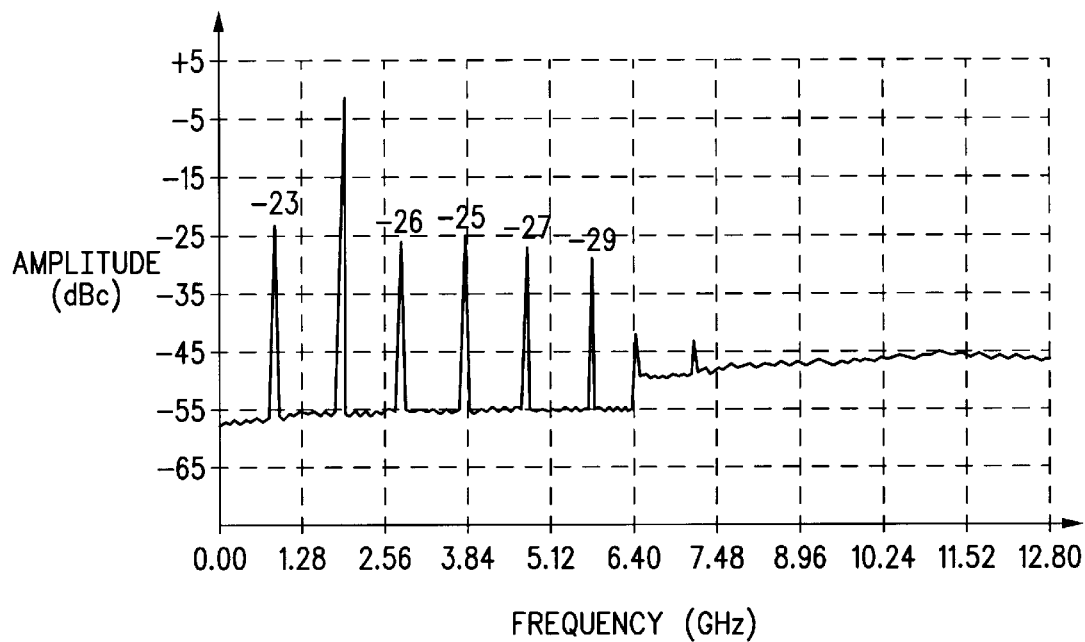
FIG. 7 is a graphical representation of the high band frequency spectrum of a prior art voltage controlled oscillator.

FIG. 7 is an actual spectrum analyzer plot for a high band frequency spectrum of the prior art voltage controlled oscillator utilizing a frequency doubler. As can be seen, the use of a multiplier circuit produces a subharmonic below the main response having a level of −23 dbc.

Figure 8:
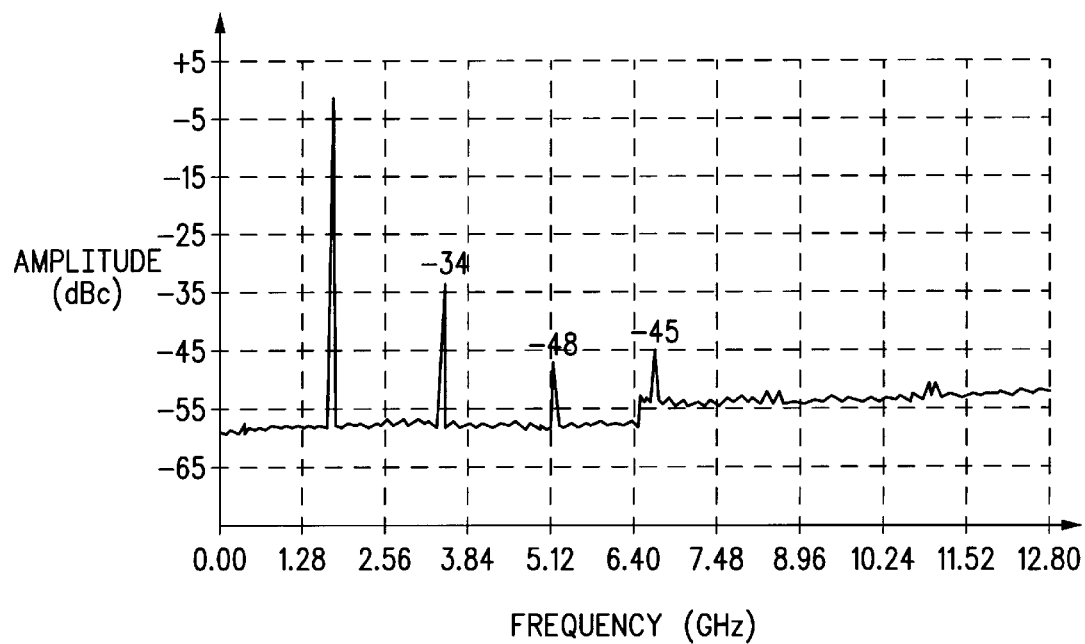
FIG. 8 is a graphical representation of the high band frequency spectrum of the circuit of FIG. 3.

FIG. 8 is an actual spectrum analyzer plot for the high band frequency spectrum of a device built in accordance with the present invention where the advantage of the present invention can best be seen. The response is much better than the plot of FIG. 7. There is no subharmonic below the main response and the higher harmonics are few and of a lower level.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A combiner circuit for first and second voltage controlled oscillator outputs operable within associated first and second frequency bands, comprising:

a first and second resonant circuit coupled in shunt at the respective first and second outputs, the first resonant circuit having a passband at the first frequency band, the second resonant circuit having a passband at the second frequency band; and a first and second inductance each coupled in series from the respective first and second outputs to a common output port, the first inductance in conjunction with the first resonant circuit having a stopband at the second frequency band substantially isolating the first output from the common output port when the second voltage controlled oscillator output is operating within the second frequency band, the second inductance in conjunction with the second resonant circuit having a stopband at the first frequency band substantially isolating the second output from the common output port when the first voltage controlled oscillator output is operating within the first frequency band, the inductances each have a value substantially equal to respective lumped-element inductances of one-quarter wavelength transmission lines operable at their associated frequency bands, and wherein the resonant circuits include associated capacitances having a value increased, over a value necessary to cause resonance at the associated frequency, by a value substantially equal to respective lumped-element capacitances of one-quarter wavelength transmission lines operable at their associated frequency bands.

2. The combiner circuit of claim 1, wherein the inductances are transmission lines.

3. The combiner circuit of claim 1, wherein the inductances are transmission lines each having an electrical length of less than one-quarter wavelength at their associated frequency bands to compensate for stray capacitance in the combiner circuit.

4. The combiner circuit of claim 1, wherein the inductances are inductors, and further comprising a shunt capacitance coupled at the common output port.

5. The combiner circuit of claim 1, further comprising a shunt capacitance coupled at the common output port.

6. The combiner circuit of claim 5, wherein the shunt capacitance has a value substantially equal to a sum of the lumped capacitances of one-quarter wavelength transmission lines operable at their associated frequency bands.

7. A dual band radio communication device having a receiver and including a dual-band frequency source with first and second voltage controlled oscillators operable within associated first and second frequency bands, the frequency source including a combiner circuit for combining outputs of the first and second voltage controlled oscillator, the combiner circuit comprising:

a first and second resonant circuit coupled in shunt at the respective first and second outputs, the first resonant circuit having a passband at the first frequency band, the second resonant circuit having a passband at the second frequency band; and a first and second inductance each coupled in series from the respective first and second outputs to a common output port, the first inductance in conjunction with the first resonant circuit having a stopband at the second frequency band substantially isolating the first output from the common output port when the second voltage controlled oscillator output is operating within the second frequency band, the second inductance in conjunction with the second resonant circuit having a stopband at the first frequency band substantially isolating the second output from the common output port when the first voltage controlled oscillator output is operating within the first frequency band, the inductances each have a value substantially equal to respective lumped-element inductances of one-quarter wavelength transmission lines operable at their associated frequency bands, and wherein the resonant circuits include associated capacitances having a value increased, over a value necessary to cause resonance at the associated frequency, by a value substantially equal to respective lumped-element capacitances of one-quarter wavelength transmission lines operable at their associated frequency bands.

8. The dual band radio of claim 7, wherein the inductances are transmission lines each having an electrical length of about one-quarter wavelength at their associated frequency bands.

9. The dual band radio of claim 7, wherein the inductances are transmission lines each having an electrical length of less than one-quarter wavelength at their associated frequency bands to compensate for stray capacitance in the combiner circuit.

10. The dual band radio of claim 9, further comprising a shunt capacitance coupled at the common output port.

11. The dual band radio of claim 7, wherein the inductances are inductors, and further comprising a shunt capacitance coupled at the common output port.

12. The dual band radio of claim 11, wherein the shunt capacitance has a value substantially equal to a sum of the lumped capacitances of one-quarter wavelength transmission lines operable at their associated frequency bands.

* * * * *